Oct. 12, 1937.  P. R. BASSETT ET AL  2,095,626
SOUNDPROOF CABIN FOR AIRCRAFT
Filed April 20, 1933
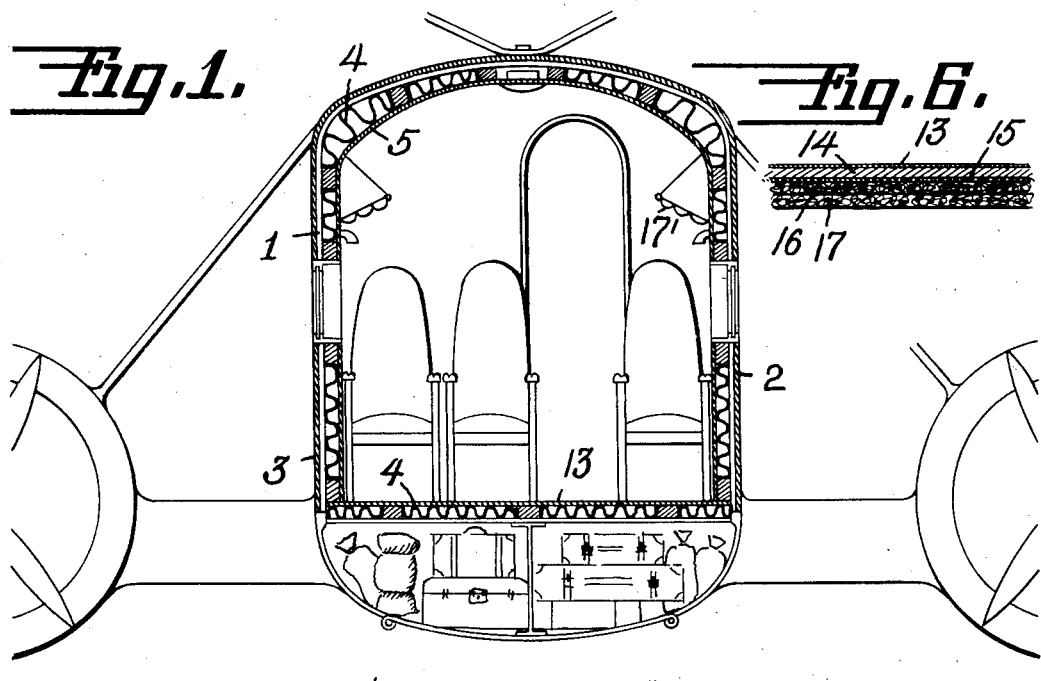
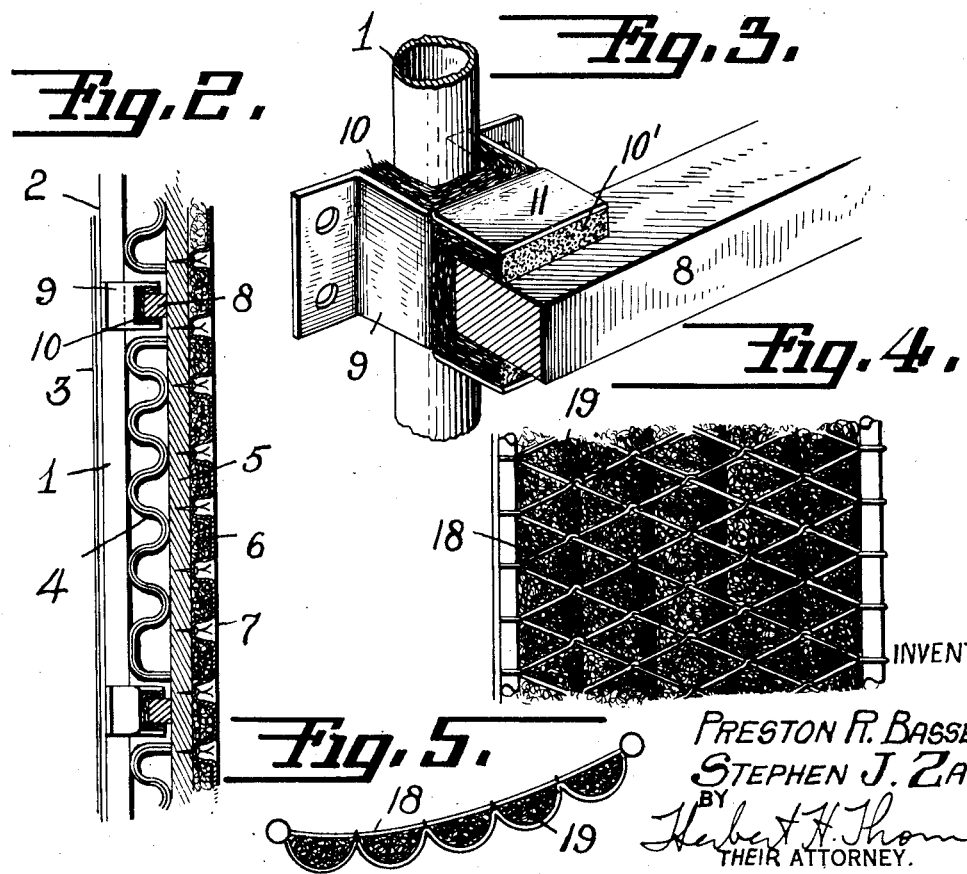
INVENTORS:
PRESTON R. BASSETT
STEPHEN J. ZAND.
BY Herbert H. Thompson
THEIR ATTORNEY.

Patented Oct. 12, 1937

2,095,626

UNITED STATES PATENT OFFICE 2,095,626

SOUNDPROOF CABIN FOR AIRCRAFT

Preston R. Bassett, Rockville Centre, and Stephen J. Zand, Forest Hills, N. Y., assignors to Sperry Gyroscope Company, Inc., Brooklyn, N. Y., a corporation of New York Application April 20, 1933, Serial No. 666,940

5 Claims. (Cl. 20—4)

This invention relates to means for lessening the noise and vibration in the cabins of aircraft, especially of the passenger carrying type. In aircraft now in use, the noise level is so high and the vibration so marked as to cause actual discomfort to the passengers and virtually prevent ordinary conversation. This invention is directed to a sound absorbing construction for the walls and fixtures of the cabin so as to prevent the greater portion of the exterior noise from entering the cabin and to prevent the engine vibrations from being transmitted to the interior walls of the cabin.

Referring to the drawing illustrating the preferred form of the invention,

Fig. 1 is a vertical section through an aircraft cabin constructed according to our invention.

Fig. 2 is a sectional view of one of the walls on a larger scale than Fig. 1.

Fig. 3 is a detail of the method of supporting the floor or cross beams from the structural framework to avoid vibration.

Fig. 4 is a bottom view of a portion of one of the baggage holders constructed for maximum sound absorption.

Fig. 5 is an end view of the same.

Fig. 6 is a sectional view of the preferred composition flooring.

The framework of airplane cabins is usually formed of hollow tubing 1 to the exterior of which stringers 2 are secured for supporting the doped fabric covering 3. Instead of securing the interior trim directly to such structure as is usually done, we interpose one or more layers of sound absorbing material. As shown, we first interpose a layer 4 of corrugated, soft material, such as seepack, resembling corrugated blotting paper, which more or less fills the space between the outer coverings and the inner wooden framework or wall 5 which is preferably made of light, soft wood and to which layer 4 may be secured. On the interior surface of said wood we secure another thickness of sound absorbing material 6 in sheet or blanket form, such as Insulite or Celotex, and to the inner surface of this material we secure the final cloth or other trim coating 7.

We also provide a non-sound transmitting medium between the points where the tubular framework 1 supports the cross beams 8 of the walls and floors to prevent frame vibrations from being transmitted to the cabin walls. To this end we have shown sheet metal U-shaped clamps 9 adapted to be placed around the tubes at spaced points with a thick coating of felt 10 or similar material between the clamp and the tube. Said clamp is also provided with outwardly extending ears 11 which support the cross beams 8 and between the same we place a similar layer of felt 10'. By this means the vibration of the framework of the cabin is not transmitted to the interior walls thereof.

On the floor, instead of employing ordinary flooring, we use a lighter floor material having sound absorbing qualities. Said flooring is preferably of the form shown in section in Fig. 6, and consists of a very thin sheet of aluminum 13 intimately united with a thin, light board 14 to the back of which is united a thin perforated aluminum sheet 15 which serves to hold one or more sheets of felt 16 and 17 to the composition flooring. By this means an extremely light, yet stiff, flooring is obtained which, at the same time, possesses remarkable sound absorbing properties.

We have also found that further sound may be absorbed within the cabin by making the interior fixtures of sound absorbing material. Thus we have shown the baggage racks 17' as made up of the usual coarse netting or cord mesh 18 but secured thereto is soft wool-like material 19 having a broken or undulating under surface designed to break up and absorb the sound waves. Sound is also prevented from coming up through the floor of the craft by having the baggage compartment under the same in which the soft baggage and mail bags are stored.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a soundproof cabin for aircraft having an outer wall and a substantially rigid and imperforate inner wall, a corrugated pliable sound absorbing material extending between the inner and outer walls thereof and carried by said inner wall, the successive corrugations of said sound absorbing material abutting said inner and outer walls alternately, and sound absorbing material within the inner wall and attached thereto and forming the interior trim.

2. In a soundproof cabin for aircraft having an outer wall and a substantially rigid inner wall, corrugated sound absorbing material lying between the inner and outer walls thereof, the successive corrugations of said sound absorbing material abutting said inner and outer walls alternately, spaced brackets for supporting the wall and floor beams from the metal framework of the cabin, sound absorbing material between each bracket and said metal framework and between each bracket and its beam, and soft sound absorbing material secured to the inner surface of the inner wall and forming the interior trim.

3. A sound absorbing floor construction for aircraft cabins comprising the combination with the floor beams, sections of sound absorbing corrugated material extending laterally between said beams, and a flooring material overlying and secured to said beams comprising a thin board, a sheet aluminum top thereon, a perforated aluminum backing on the bottom of said board, and a sheet of felt-like material secured to said perforated aluminum backing.

4. A sound absorbing floor construction for aircraft, including a flooring material adapted to be secured to the floor cross beams comprising a thin board, sections of corrugated sound absorbing material extending between the floor cross beams, a thin sheet of aluminum cemented to the top of said thin board, a perforated aluminum backing secured to the bottom of said board, and a sheet of felt-like material cemented to the under surface of said aluminum backing.

5. In a soundproof cabin for aircraft having an outer wall structure and an inner wall structure spaced from said outer wall structure, a corrugated sheet of pliable sound absorbing material interposed between said wall structures and disposed so that consecutive corrugations thereof alternately engage the outer and inner wall structures, said inner wall structure being rigid, a blanket-like layer of sound absorbing interior trim material attached to the inner surface of said inner wall, and a thin finishing sheet secured to the inner surface of said blanket-like layer.

PRESTON R. BASSETT.
STEPHEN J. ZAND.